May 28, 1957     R. A. McCULLOUGH     2,793,657
THREE-WAY WATER VALVE ASSEMBLY FOR CONCRETE MIXERS OR THE LIKE
Filed Aug. 9, 1951     3 Sheets-Sheet 1

INVENTOR
RAY A. McCULLOUGH
by Hoopes, Leonard & Glenn
his attorneys

May 28, 1957 R. A. McCULLOUGH 2,793,657
THREE-WAY WATER VALVE ASSEMBLY FOR CONCRETE MIXERS OR THE LIKE
Filed Aug. 9, 1951 3 Sheets-Sheet 2

INVENTOR
RAY A. McCULLOUGH
by Hoopes, Leonard & Stemm
his attorneys

May 28, 1957  R. A. McCULLOUGH  2,793,657
THREE-WAY WATER VALVE ASSEMBLY FOR CONCRETE MIXERS OR THE LIKE
Filed Aug. 9, 1951  3 Sheets-Sheet 3
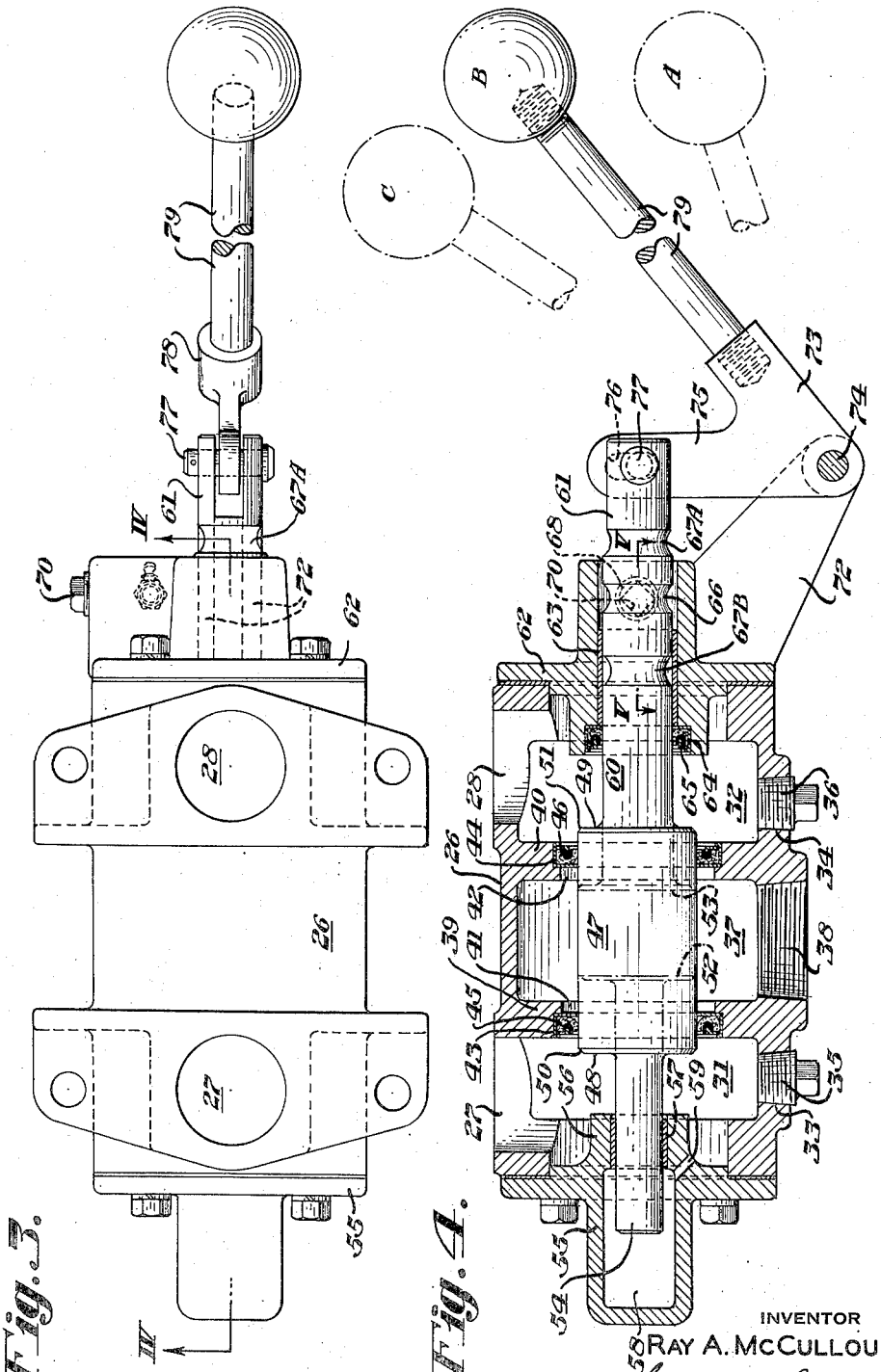
INVENTOR
RAY A. McCULLOUGH
by Hoopes, Leonard & Glenn
his attorneys.

United States Patent Office 2,793,657
Patented May 28, 1957

2,793,657

THREE-WAY WATER VALVE ASSEMBLY FOR CONCRETE MIXERS OR THE LIKE

Ray A. McCullough, Oakmont, Pa., assignor, by mesne assignments, to Blaw-Knox Company, Pittsburgh, Pa., a corporation of Delaware Application August 9, 1951, Serial No. 241,102

3 Claims. (Cl. 137—625.4)

This invention relates to a novel three-way mixing and washing water valve assembly for concrete mixers or the like. More particularly, it relates to such a valve assembly in which a cylindrical valve spool is employed and held in precise alignment in each of its functioning positions.

In the art of concrete mixers, it has been customary to provide a tank both for mixing water and for washing water connected to the mixing drum. In some cases, the same tank is used for both water supplies but is internally divided into sections to keep the mixing water separate from the washing water. These tanks are also of a size, in many cases, the capacity of which is a measure of the amount of washing and mixing water respectively that is required. As is well known, the wash water is used after the drum has been emptied to wash out residual concrete to avoid incrustations therein. It has also been customary to have separate valves such as globe valves and separate connections from the respective water supplies to the mixing drum or to the suction line of a pump to pump such water into the drum. Such arrangement usually requires use of considerable space for valves and piping and interferes with ready accessibility of other parts of the mixer. In addition, it was possible to have both valves open at the same time and required some close attention by the operator to observe whether the valves were open or closed at a particular time.

In this invention, a novel three-way valve assembly is provided which obviates the foregoing problem. By means of this new valve assembly, a relatively inexpensive yet effective device is provided which provides communication between only one such water supply and the mixing drum at one time and further provides a single shut-off for both water supplies. In addition, in this invention the valve spool used is not grooved or ported and in its travel to either extreme position is wholly removed from one of the seals permitting fast admission of water to the mixing drum. Moreover, the imperforate nature of the valve spool protects the seals against wear and deterioration. No lubrication is required other than such as may be provided by the water itself. Means are also provided in this invention for holding the valve spool in its preselected position. The travel of the new valve is such that a greater admission area may be provided for the usually larger quantity of mixing water. At the same time, the valve spool is maintained in precise alignment with the seals and the construction as a whole is such that a minimum of parts and of machining is required.

Other objects and advantages of this invention will be apparent from the following description and drawings, which are illustrative only, in which Figure 1 is a side view of a portion of a concrete mixer using one embodiment of the novel valve assembly of this invention;

Figure 3 is a plan view on a somewhat larger scale of the valve assembly of this invention shown in Figure 1;

Figure 4 is a view in cross section of the assembly shown in Figure 3 taken along line IV—IV thereof.

Figure 1:
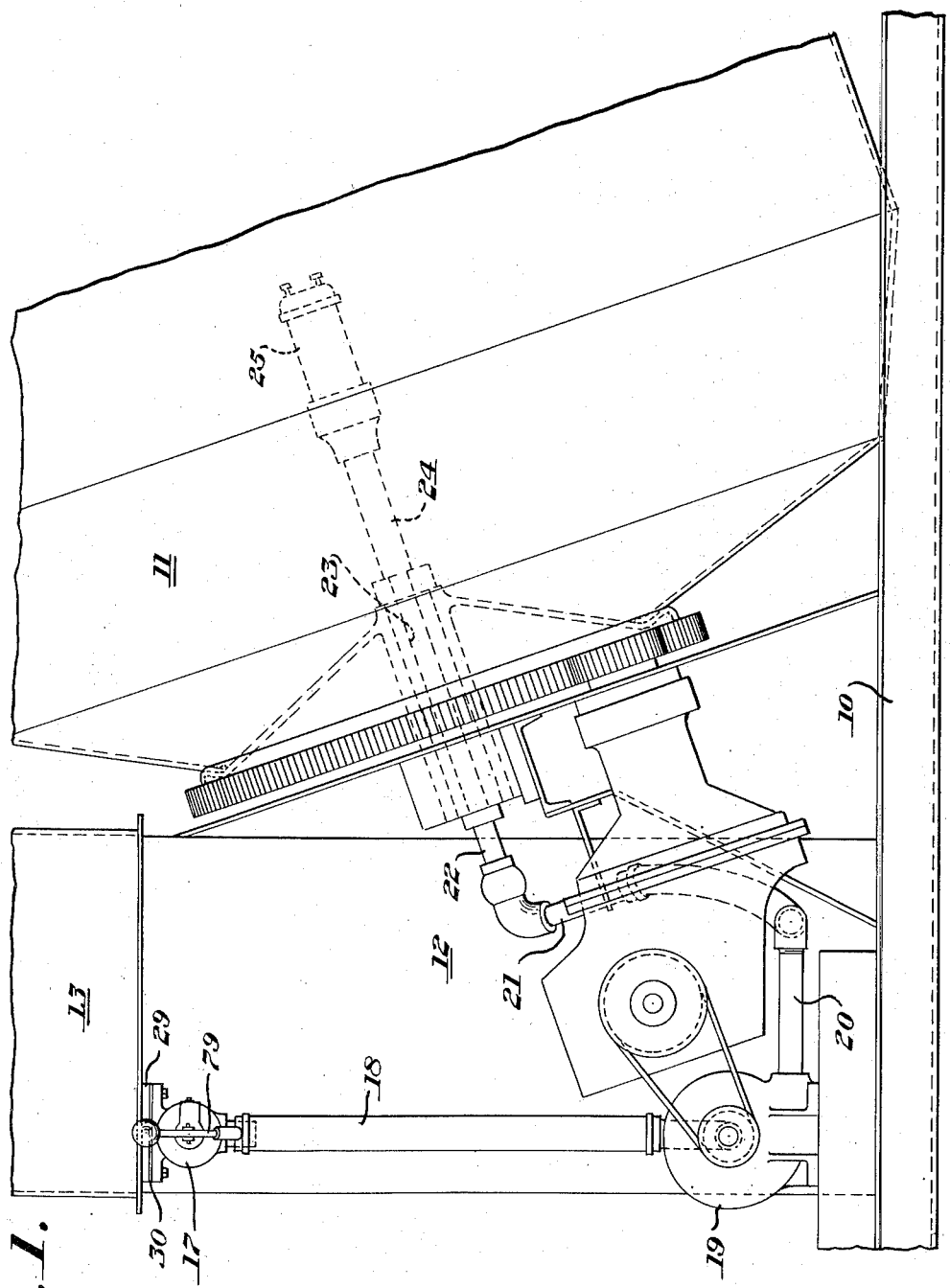
Figure 2:
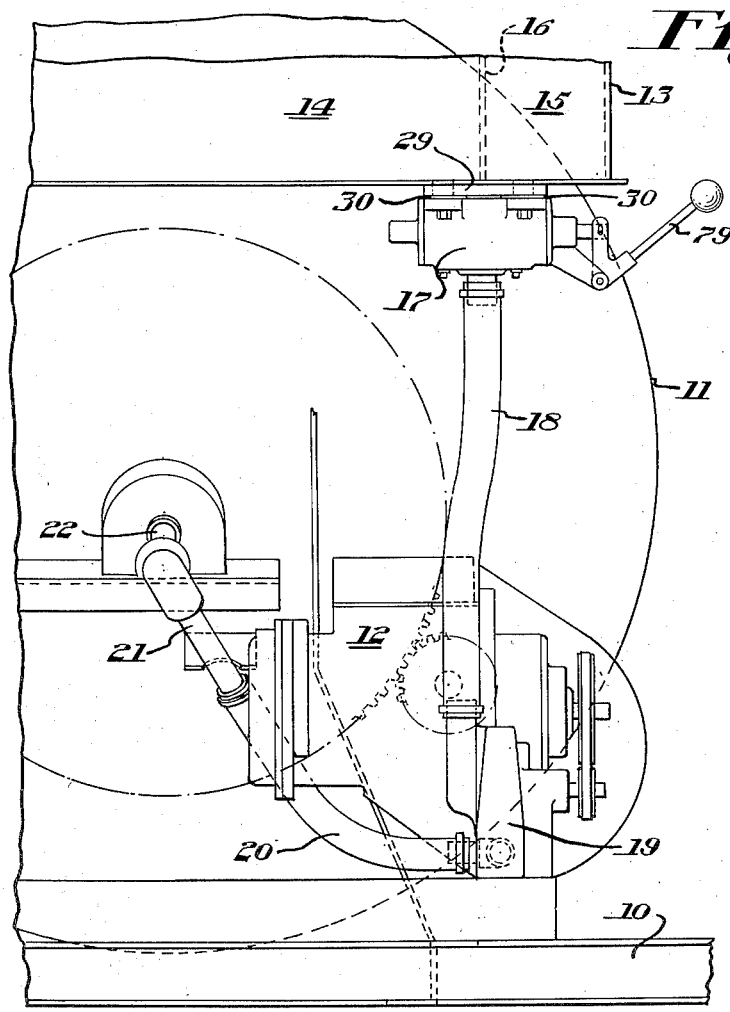
Figure 2 is an end view from the left of the structure shown in Figure 1.
Figure 5:
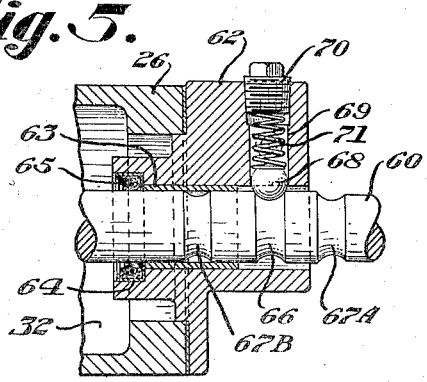
Figure 5 is a detailed view taken along line V—V of Figure 4.

As shown in Figures 1 and 2, a frame 10 supports a rotatable mixing drum 11 for a concrete mixer or the like and the associated equipment 12. Included in such associated equipment there is provided a water tank 13 having two compartments or sections 14 and 15 therein respectively for mixing water and washing water. These tanks usually have a capacity which corresponds to the quantity of water needed for the respective purpose. A partition 16 separates the two compartments 14 and 15 and there is a filling opening or inlet, which is not illustrated, to each compartment. When water is supplied to the concrete mixer, it passes through a valve assembly 17 made in accordance with this invention and into a pipe 18 which is connected to the inlet or suction side of a centrifugal pump 19. A further pipe 20 is connected to the outlet of pump 19 and in turn through piping connections 21, 22, 23 and 24 delivers the water to the interior of drum 11 through a nozzle 25.

If the concrete mixer illustrated is a transit mixer, water tank section 14 may be emptied into drum 11 during transit to have the mix ready for discharge upon arriving at the pouring location. It is usually important that the quantity of water supplied for mixing be relatively precise. Hence, care has usually to be exercised to insure that additional water from compartment 15, for example, is not allowed to enter the pump suction pipe 18. Thereafter, as soon as the load of concrete in drum 11 is discharged, it is usually advisable to supply washing water to the interior of the drum. This would be done by then emptying the contents of water tank section 15 into drum 11 and washing the inside thereof by rotating the drum to prevent the hardening of concrete on the internal surfaces thereof.

Valve assembly 17 is provided with a valve body 26 usually cast and cored as shown in Figures 3 and 4. A mixing water inlet or port 27 and a wash water port or inlet 28 are provided in body 26. Outlet openings, respectively from water tank sections 14 and 15, extend through a tank bottom reinforcing plate or pad 29 welded to the bottom of the tank and register with the respective inlets 27 and 28. Body 26 may be secured to plate 29 by means of tap screws as shown in Figures 1 and 2. Tapped and threaded holes may be provided in the plate 29 to receive the connecting tap screws. Gaskets 30 are interposed between body 26 and plate 29 around the ports 27 and 28 respectively to make a water tight joint. The inlets 27 and 28 include cored passages 31 and 32 respectively. At the bottom of these inlet passages pipe taps 33 and 34 respectively are provided extending through the bottom wall of body 26. Clean-out plugs 35 and 36 respectively close and seal the tapped openings 33 and 34. Intermediate the passages 31 and 32, there is a cored passage 37 which forms a part of a single or common outlet 38 for the valve assembly 17. Passages 31 and 37 are separated by an internal partition 39 and passages 32 and 37 are separated by an internal partition 40. These partitions respectively have openings 41 and 42 extending therethrough in axial registry with one another. The partitions 39 and 40 are recessed respectively at 43 and 44 around their openings for sealing rings 45 and 46. These sealing rings extend radially and circumferentially to define the clear opening through the respective partitions. When either or both of the sealing rings 45 and 46 are in contact with a valve spool 47, the opening in question is blocked and the cored passages on the two sides of that opening are shut off one from the other. The sealing rings 45 and 46 are conventional in nature and may be of the "Garlock" ring type.

Valve spool 47 is cylindrical and imperforate in the sense that it is a right cylinder without any ports or grooves on the surface thereof and has no openings therethrough. Thereby any wear or tearing or undue deterioration of the sealing ring 45 or 46 or both is prevented because no sharp edges can move past these sealing rings. The peripheral edges at the ends 48 and 49 of valve spool 47 are chamfered as shown at 50 and 51. This chamfer which may also be a gentle taper or curve is adapted to assist in re-effecting a seal without damage to the sealing ring on those occasions when the respective ends of the valve spool 47 adjacent to such rings are moved into re-engagement therewith from an inwardly to an outwardly position relative to the valve body 26. Thus, when valve spool 47 is in its extreme right-hand axial position when viewed as in Figure 4, end 48 will be in the dotted position 52 and out of contact with sealing ring 45. Thereby, inlet 27 is placed in free and open communication with outlet 38 through opening 41. Conversely, when valve spool 47 is in its extreme left-hand axial position, end 49 will be in the position indicated by reference numeral 53 and valve spool 47 will be out of contact with sealing ring 46. Thereby, inlet 28 will be in free and open communication with outlet 38 through opening 42. The axial length of valve spool 47 as shown in Figure 4 is slightly greater than the distance between the partitions 39 and 40. Hence, in its intermediate position as shown in that Figure 4, both inlets 27 and 28 are closed or shut off from outlet 38 and when the valve spool 47 is moved to either extreme axial position only that inlet is opened to the outlet which is farther from the direction toward which valve spool 47 is moved into such extreme axial position.

An axially extending guide 54 is coaxial with and an integral part of valve spool 47. The diameter of guide member 54 is considerably less than the diameter of valve spool 47. Guide member or extension 54 assists in maintaining valve spool 47 in precise alignment with opening 41 and sealing ring 45 even when end 48 thereof is in position 52. Guide 54 in turn is supported by a closed bearing 55 bolted to the left-hand end of valve body 26 as viewed in Figures 3 and 4. A suitable gasket material is provided between the flanges of bearing 55 and the corresponding surface of valve body 26. In bearing 55 there is an inward extension 56 having a bushing 57 therein to afford guiding support to guide 54 on the other side of passage 31 from opening 41. The outermost end of guide 54 is adapted to move axially in a chamber 58 which at all times is in communication with passage 31 through an interior opening 59. Since water tank section 14 is usually about at atmospheric pressure, chamber 58 will be substantially at such pressure. The water that gets into chamber 58 is readily displaced when required through the opening 59 in the operation of the valve assembly of this invention. At the other end of valve spool 47 a shank 60 extends outwardly from end 49. Shank 60 is coaxial with valve spool 47 and integral therewith. It also has a lesser diameter than the diameter of valve spool 47. Unlike guide 54, shank 60 extends to the outside of the enclosed valve assembly and is provided at its outer end with a clevis 61. A supporting casting 62, suitably bored, is provided for shank 60. The casting 62 is bolted to the end of valve body 26 as shown in Figures 3 and 4 and is provided with a gasket between the seating surfaces to maintain the sealed character of the interior of the valve assembly 17. A bushing 63 lines the sides of the bore through casting 62 and slidably supports the axial movements of shank 60. A recess 64 at the inner end of support 62 is provided with a sealing ring 65 to prevent leakage outwardly around shank 60.

Shank 60 is provided with circumferential grooves 66, 67A and 67B respectively for holding valve spool 47 in its intermediate position and in its extreme axial positions as viewed in Figure 4. A detent ball 68 coacts with the respective grooves 66, 67A and 67B for such holding. Ball 68 is freely movable in a drilled opening 69 in casting 62. The outer end of opening 69 is tapped for the reception of a plug 70. A spring 71 is interposed in opening 69 between plug 70 and ball 68 to constantly urge ball 68 inwardly toward the axis of shank 60. The outer end of bushing 63 terminates inwardly of ball 68 so that there is no interference therebetween. In its extreme right-hand axial position as viewed in Figure 4, the shank 60 will have ball 68 pressing thereagainst inwardly of groove 66 an axial distance equal to the amount of movement between the intermediate position of valve spool 47 and its extreme right-hand axial position. The length of shank 60 is such that, in the extreme left-hand position of the valve with the detent ball latched in groove 67A, the groove 67B is still to the right of the sealing ring 65. Thereby, only the smooth machined surface portion of shank 60 will move relative to sealing ring 65, the sealing integrity of which is accordingly not impaired.

A bracket 72 extends outwardly and slightly downwardly from casting 62 of which it is a part. A bell crank 73 is pivotally connected by a pin 74 to bracket 72. Arm 75 of crank 73 is slotted at 76 and passes between the sides of clevis 61. A pin 77 passes through openings in the sides of clevis 61 and through slot 76 to link arm 75 to the outer end of shank 60. The other arm 78 of crank 73 is recessed and tapped for the end of a selector or control handle 79.

Handle 79 may be moved by an operator of a concrete mixer or the like into positions A, B or C. In position A, the extreme right-hand axial position, ball 68 engages groove 67B and mixing water from tank compartment 14 will flow into suction pipe 18 and thence into mixing drum 11. The construction and location of crank 73 is such that the movement of valve spool 47 to the right, as viewed in Figure 4, provides a larger opening by moving end 48 a greater distance from partition 39 than is the spacing of end 49 from partition 40 when valve spool 47 is moved into its extreme left-hand position as viewed in Figure 4. During the admission of mixing water from inlet 27 to suction line 18, inlet 28 is completely sealed off from outlet 38. Conversely, when handle 79 is moved into position C, ball 68 engages groove 67A and washing water from tank compartment 15 will pass into suction line 18, while inlet 27 remains completely sealed off from outlet 38. The distance between end 48 and the inner face of the portion 56 of bearing 55 may be used as a limit for movement of valve spool 47 to the left, although ball 68 and groove 67 are usually sufficient for such a purpose. Between admissions of water to suction pipe 18, the operator will place handle 79 in position B, thereby sealing off, as shown in Figure 4, both inlets 27 and 28 from outlet 38. In position B, ball 68 will engage groove 66. If desired, a position scale can be marked on the side of bracket 72 adjacent the left-hand edge of crank 73 for the guidance of the operator in indicating the relative position of valve spool 47 in the assembly.

Various changes in the details of the foregoing novel valve assembly may be made without departing from the spirit of the invention or the scope of the appended claims.

I claim:

1. In a three-way mixing and washing water valve assembly unit for concrete mixers or the like, in combination, a valve body having a seating surface and separate mixing water and washing water inlets extending through said surface, said valve body further having a common outlet through which water is deliverable into said concrete mixers or the like, partitions within said body respectively separating said inlets from said outlet, openings through said partitions in axial registry with one another, an imperforate valve spool axially slidable relative to said openings, the axial length of said valve spool being at least equal to the axial distance between said partitions, said inlets having passages into which the respective ends of said valve spool extend at least when said valve spool is in either of its extreme axial positions, said passages being greater than the diameter of said valve spool, said respective ends being subject to the pressure in said respective passages, and a co-axially extending shank and guide extending from said ends of said valve spool respectively to guide it, said shank and guide respectively being of lesser diameter than said valve spool, whereby in its extreme axial positions said valve spool permits communication between one of said inlets respectively and said outlet and in its intermediate position shuts off both said inlets from said outlet.

2. In a three-way mixing and washing water valve assembly unit for concrete mixers or the like, in combination, a valve body having a seating surface and separate mixing water and washing water inlets extending through said surface, said valve body further having a common outlet, partitions within said body respectively separating said inlets from said outlet and symmetrically located relative thereto, openings through said partitions in axial registry with one another, an imperforate valve spool axially slidable relative to said openings, the axial length of said valve spool being at least equal to the axial distance between said partitions, said inlets having passages into which the respective ends of said valve spool extend at least when said valve spool is in either of its extreme axial positions, said passages being greater than the diameter of said valve spool, said respective ends being subject to the pressure in said respective passages, an axially extending guide extending from one end of said valve spool, an axially extending shank extending from the other end of said valve spool, said guide and shank respectively being of lesser diameter than said valve spool, means for moving said valve spool axially a different distance in each direction to its extreme axial position in that direction, and means for holding said valve in the position into which it is so moved, whereby in its extreme axial positions said valve spool permits communication to a different extent respectively between said inlets and said outlet and in its intermediate position shuts off both said inlets from said outlet.

3. In a three-way mixing and washing water valve assembly unit for concrete mixers or the like, in combination, a valve body having a seating surface and separate mixing water and washing water inlets extending through said surface, said valve body further having a common outlet, partitions within said body respectively separating said inlets from said outlet, openings through said partitions in axial registry with one another, an imperforate valve spool of generally uniform diameter axially slidable relative to said openings, the axial length of said valve spool being at least equal to the axial distance between said partitions, said inlets having passages into which the respective ends of said valve spool extend at least when said valve spool is in either of its extreme axial positions, said passages being greater than the diameter of said valve spool, said respective ends being subject to the pressure in said respective passages, an axially extending guide extending from one end of said valve spool, a closed bearing for said guide outwardly of said valve spool and of the inlet passage adjacent said one end of said valve spool, an axially extending shank extending from the other end of said guide spool, said guide and shank respectively being of lesser diameter than said valve spool, a bearing for said shank positioned outwardly of said valve spool, and means for selectively holding said valve spool in a predetermined axial position, whereby in its extreme positions said valve spool permits communication between one of said inlets respectively and said outlet and in its intermediate position shuts off both said inlets from said outlet.

References Cited in the file of this patent

UNITED STATES PATENTS

| Number | Name | Date |
|---|---|---|
| 173,653 | Locke | Feb. 15, 1876 |
| 1,204,972 | Grabler | Nov. 14, 1916 |
| 1,208,598 | Mackey | Dec. 12, 1916 |
| 1,320,944 | Thoens | Nov. 4, 1919 |
| 1,525,100 | Lichtenberg | Feb. 3, 1925 |
| 1,850,431 | Watkins | Mar. 22, 1932 |
| 2,146,729 | Gavin | Feb. 14, 1939 |
| 2,369,357 | Kunz | Feb. 13, 1945 |
| 2,391,930 | Stone | Jan. 1, 1946 |
| 2,415,417 | Collins | Feb. 11, 1947 |
| 2,485,504 | Morgan | Oct. 18, 1949 |
| 2,501,661 | Christensen | Mar. 28, 1950 |
| 2,506,129 | Ashton | May 2, 1950 |
| 2,524,142 | Seeloff | Oct. 3, 1950 |
| 2,617,257 | Douglas | Nov. 11, 1952 |
| 2,619,037 | O'Connor | Nov. 25, 1952 |